US007631658B2

(12) United States Patent
Graeve, Jr.

(10) Patent No.: US 7,631,658 B2
(45) Date of Patent: Dec. 15, 2009

(54) WATER SUPPLY SYSTEM

(76) Inventor: Theodore H. Graeve, Jr., 461 17th St. SW., Naples, FL (US) 34117

( * ) Notice: Subject to any disclaimer, the term of this patent is extended or adjusted under 35 U.S.C. 154(b) by 558 days.

(21) Appl. No.: 11/503,733

(22) Filed: Aug. 14, 2006

(65) Prior Publication Data

US 2008/0035216 A1 Feb. 14, 2008

(51) Int. Cl.
*F16K 37/00* (2006.01)

(52) U.S. Cl. ........................ 137/558; 137/571; 137/572; 137/565.01

(58) Field of Classification Search ................. 137/558, 137/571, 572, 565.01, 428
See application file for complete search history.

(56) References Cited

U.S. PATENT DOCUMENTS

| | | | | |
|---|---|---|---|---|
| 2,243,188 | A | 5/1941 | Biach | |
| 2,257,393 | A | 9/1941 | Moore | |
| 2,605,780 | A | 8/1952 | Nance | |
| 2,751,924 | A | 6/1956 | Hynd | |
| 2,860,655 | A | 11/1958 | Bayless et al. | |
| 2,966,921 | A | 1/1961 | Whiteman | |
| 3,158,193 | A | 11/1964 | Anderson | |
| 3,604,594 | A * | 9/1971 | Isreeli et al. | 222/64 |
| 3,807,433 | A | 4/1974 | Byrd | |
| 5,823,097 | A * | 10/1998 | Dirck | 137/558 |
| 6,026,837 | A * | 2/2000 | Chen | 137/558 |
| 6,938,635 | B2 * | 9/2005 | Bolland | 137/558 |

FOREIGN PATENT DOCUMENTS

| | | |
|---|---|---|
| JP | 355160185 | 12/1980 |

* cited by examiner

*Primary Examiner*—Kevin L Lee
(74) *Attorney, Agent, or Firm*—The Livingston Firm; Edward M. Livingston, Esq.; Bryan L. Loeffler, Esq.

(57) ABSTRACT

A water supply system (1) having at least one pressure pump (9), at least one pressure tank (3) and a plurality of water tanks (2) and (36). A submersible pump (37) is connected to a well (38) and a main water tank (36), which is connected to the other water tanks (2) via hoses (4), is connected to the pressure pump (9). The pressure pump (9), in turn, is connected to the pressure tank (3). Finally, the pressure tank (3) is connected to a plurality of water supply pipes (5) which supply water to varying areas of a plant. The main water tank (36) contains a plurality of float switches (28) at varying levels so as to indicate when the water supply needs to be activated, when the water tanks (2) and (36) are getting low and when the water tanks (2) and (36) are extremely low and the pressure pump (9) needs to be deactivated. When the pressure pump (9) is deactivated, the water is pumped from a submersible pump (37) to fill the water tanks (2) and (36). An electrical housing station (6) is used in conjunction with the water supply system (1) so as to supply power to the pressure pump (9) and includes a means for indicating varying water levels in the water tanks (2) and (36).

20 Claims, 3 Drawing Sheets

WATER SUPPLY SYSTEM

BACKGROUND OF THE INVENTION

This invention relates to water supply systems, more particularly, a water supply system that is primarily used with ready-mix concrete plants that is durable.

Currently, ready-mix concrete plants use a large amount of water per day, typically between 200,000 to 250,000 gallons per day. The water is used for a variety of purposes, including, but not limited to, keeping the rock piles wet, washing the rock yard, washing the trucks that transport the ready mix, and so forth. Thus, the need for a continuous and plentiful water flow is of great importance to the ready-mix plants and operation To achieve a continuous and plentiful flow of water, submersible pumps are commonly used to draw water from a well and to send the water directly to the ready-mix plant. However, such pumps tend to burn up and/or break down easily as they are often overused in a water-filled environment conducive to corrosion. Therefore, the submersible pumps, which are quite expensive, need to be replaced frequently in order to continue using the water supply system.

Thus, a need exists for a water supply system that virtually eliminates the need for frequent pump replacement.

The relevant prior art includes the following patents:

| U.S. Pat. No. (U.S. unless stated otherwise) | Inventor | Issue/Publication Date |
|---|---|---|
| 2,860,655 | Bayless et al. | Nov. 18, 1958 |
| 2,605,780 | Nance | Aug. 05, 1952 |
| 2,243,188 | Biach | May 27, 1941 |
| 2,966,921 | Whiteman | Jan. 03, 1961 |
| 2,751,924 | Hynd | Jun. 26, 1956 |
| 3,807,433 | Byrd | Apr. 30, 1974 |
| 3,158,193 | Anderson | Nov. 24, 1964 |
| 2.257.393 | Moore | Sep. 30, 1941 |
| JP 355160185 | Oki | Dec. 12, 1980 |

SUMMARY OF THE INVENTION

The primary object of the present invention is to provide a water supply system that virtually eliminates the need for pump replacement.

A further object of the present invention is to provide a water supply system that is durable.

An even further object of the present invention is to provide a water supply system that provides a continuous flow of water.

A further object of the present invention is to provide a water supply system that provides a plentiful flow of water.

An even further object of the present invention is to provide a water supply system that is used in ready-mix plants.

An even further object of the present invention is to provide a water supply system that indicates varying levels of water within a tank.

Another object of the present invention is to provide a water supply system that indicates when various electrical equipment needs to be activated.

The present invention fulfills the above and other objects by providing a water supply system having at least one pressure pump, at least one pressure tank, a main water tank and a plurality of water tanks. A submersible pump draws water from a well and into the main water tank. The main water tank is connected to the remaining water tanks, all of which are connected to one another via hoses. One of the water tanks is connected to the pressure pump which is, in turn, connected to the pressure tank. Finally, the pressure tank is connected to a plurality of water supply pipes which supply water to different areas of the plant. The main water tank contains a plurality of float switches of varying lengths so as to indicate when the water supply needs to be activated, when the water tank is getting low, when the water tank is extremely low and when the pressure pump needs to be activated. When the pressure pump is activated, water is pumped from the water tanks through a hose to fill the pressure tank. An electrical housing station is used in conjunction with the water supply system so as to supply power to the pressure pump and includes a means for indicating varying water levels in the water tanks.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
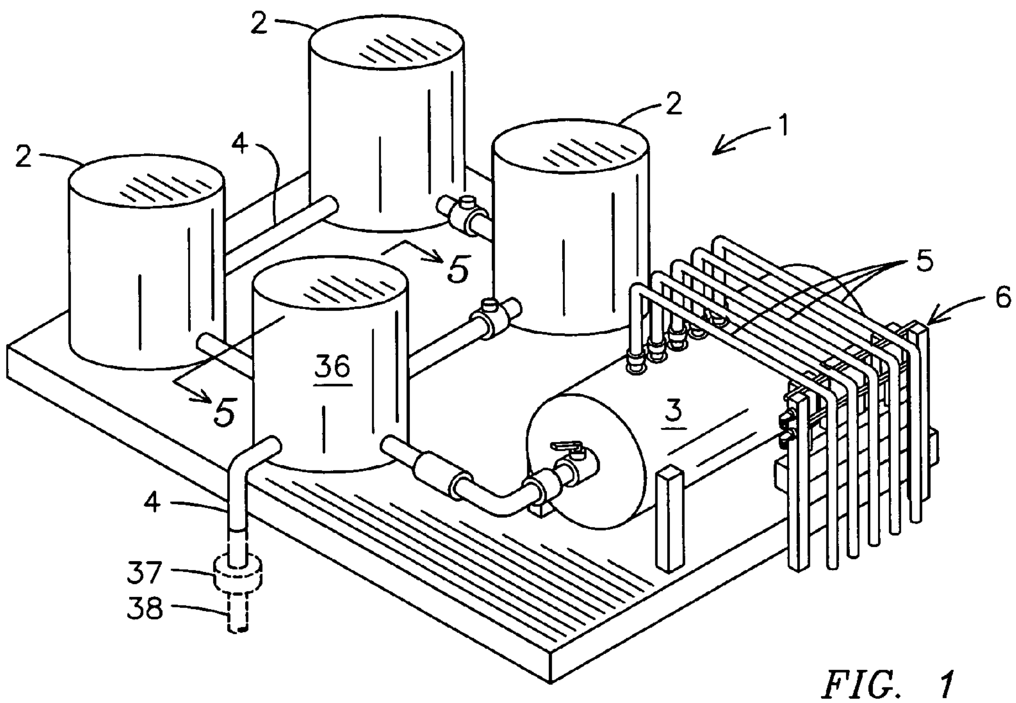
FIG. 1 is a perspective view of the water supply system of the present invention.
Figure 2:
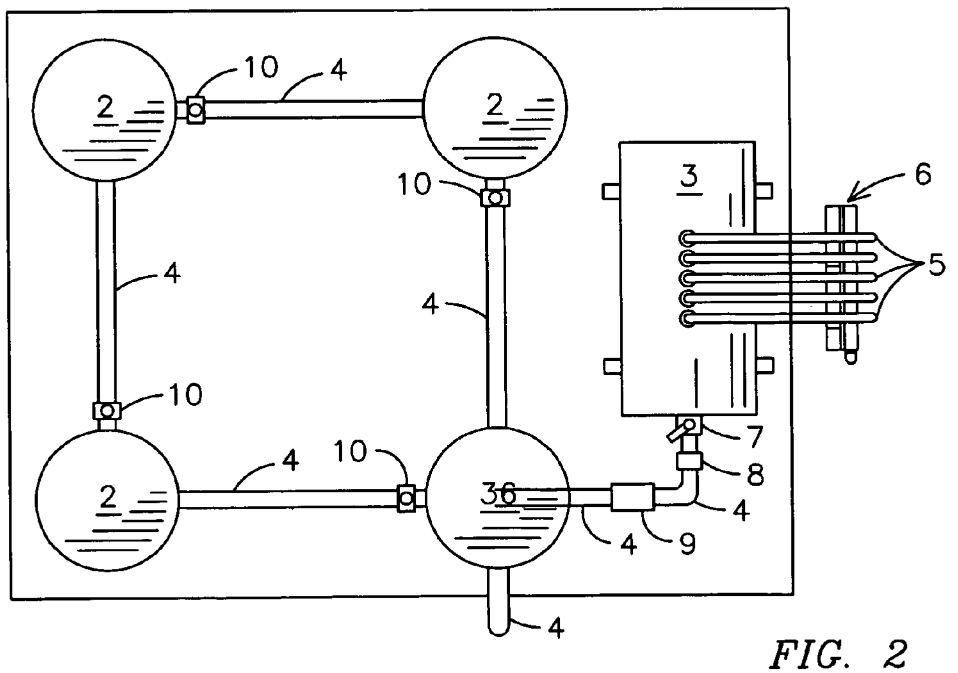
FIG. 2 is a top view of the water supply system of the present invention.

For purposes of describing the preferred embodiment, the terminology used in reference to the numbered components in the drawings is as follows:

1. water supply system, generally
2. water tank
3. pressure tank
4. hose
5. water supply pipe
6. electrical housing station
7. butterfly valve
8. check valve
9. pressure pump
10. ball valve
11. air
12. water
13. drain
14. flange
15. pressure switch
16. pressure gauge
17. air supply
18. control box
19. amber warning light
20. red warning light
21. electrical gutter
22. post
23. well pump disconnect
24. pressure pump disconnect
25. wire housing pipe
26. pressure pump tank fitting
27. weight
28. float switch 29. first float switch anchor
30. second float switch anchor
31. third float switch anchor
32. tank base
33. hose tank fitting
34. water levels
35. pressure relief valve
36. main water tank
37. submersible pump
38. well With reference to FIGS. 1 and 2, varying views of the water supply system of the present invention are shown. The water supply system, generally 1 of the present invention includes at least one pressure pump 9, at least one pressure tank 3, a main water tank 36 and a plurality of water tanks 2. The main water tank 36 holds water that is drawn from a water supply, which is preferably a well 38, preferably via a submersible pump 37. The main water tank 36 is connected to at least one of the water tanks 2. If a plurality of water tanks 2 are used, the tanks 36 and 2 are all connected to one another, preferably via hoses 4. At least one of the water tanks is connected to the pressure pump 9 also via a hose 4. The pressure pump 9, in turn, is connected to the pressure tank 3. Finally, the pressure tank 3 is connected to a plurality of water supply pipes 5 which supply water to differing areas of a plant. An electrical housing station 6 is preferably located adjacent to the water tanks 2 so as to indicate varying water levels within the water tanks 2 and to alert users of the water supply system 1 if the water tanks 2 are running low or if the pressure pump 9 needs to be activated.

When the pressure pump 9 is activated, water is pumped from the water tanks 2 and 36 through a check valve 8 and through another valve, preferably a butterfly valve 7, all of which are connected via hoses 4, to the pressure tank 3. Then, the water flows through the water supply pipes 5 to supply water to various areas of the plant. Because the remaining water tanks 2 and 36 are connected to the first water tank 2 via a hose 4, the remaining tanks fill up with a predetermined volume of water that is equal to that which fills the first water tank 2. Optional ball valves 10 may be used in conjunction with the hoses 4 so as to enable a user to shut off the water supply to a specific water tank 2 or 36.

Figure 3:
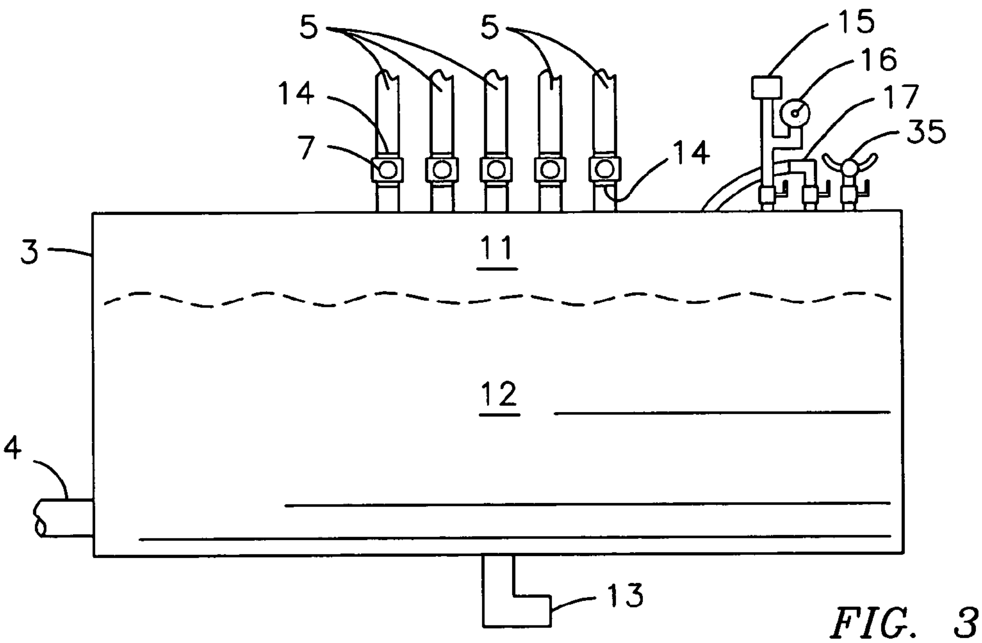
FIG. 3 is a side plan view of the pressure tank of the water supply system of the present invention.

In FIG. 3, a side plan view of the pressure tank of the water supply system of the present invention is shown. The pressure tank 3 houses a combination of air 11 and water 12 and preferably includes a drain 13 for permitting a user to quickly and easily empty the pressure tank 3. The water supply pipes 5 extend from the pressure tank 3 and preferably include a butterfly valve 7 and at least one flange 14 per water supply pipe 5. In this manner, a user may easily shut off the water supply to the pressure tank 3. A pressure switch 15, pressure gauge 16 and air supply 17 are also preferably located on the pressure tank 3 so as to indicate the amount of pressure within the pressure tank 3. A pressure relief valve 35 is also preferably located on the pressure tank 3. The pressure within the system 1 should ideally stay between 40-60 psi. In the event the system 1 falls below 40 psi, the pressure pump 9 turns on to increase the pressure to 60 psi. When 60 psi is achieved, then the pressure pump 9 turns off. In the event the pressure becomes greater than a predetermined amount, for instance, greater than 75 psi, and the pressure pump 9 does not turn off, then the pressure relief valve 35 may be used to relieve pressure, thereby preventing the pressure pump 9 from overheating.

Figure 4:
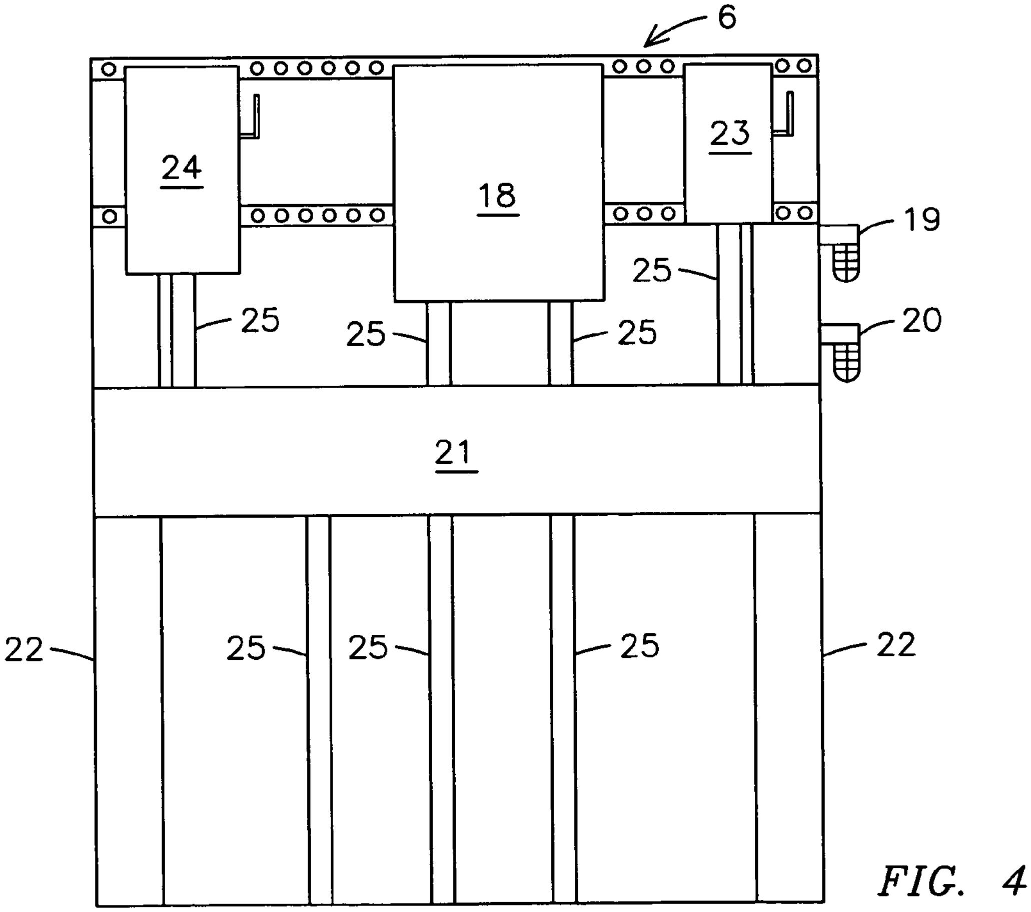
FIG. 4 is a side view of a electrical housing station of the present invention.

Next, FIG. 4 shows a side view of a electrical housing station of the present invention. The electrical housing station 6 is preferably located adjacent to the plurality of water tanks 2 and includes a control box 18, a well pump disconnect 23, a pressure pump disconnect 24 and a means for indicating varying water levels in the water tanks 2, which is preferably via an amber warning light 19 and a red warning light 20. The electrical housing station 6 also includes an electrical gutter that houses the electrical wires. In addition, a plurality of wire housing pipes 25 are located in the electrical housing station 6 so as to provide an electrical connection to varying electrical apparatuses in the electrical housing station 6, such as the control box 18, the well pump disconnect 23 and the pressure pump disconnect 24. Although the electrical housing station 6 preferably utilizes a pair of posts 22 so as to hold the electrical apparatuses above ground, other means for doing so are also envisioned.

Figure 5:
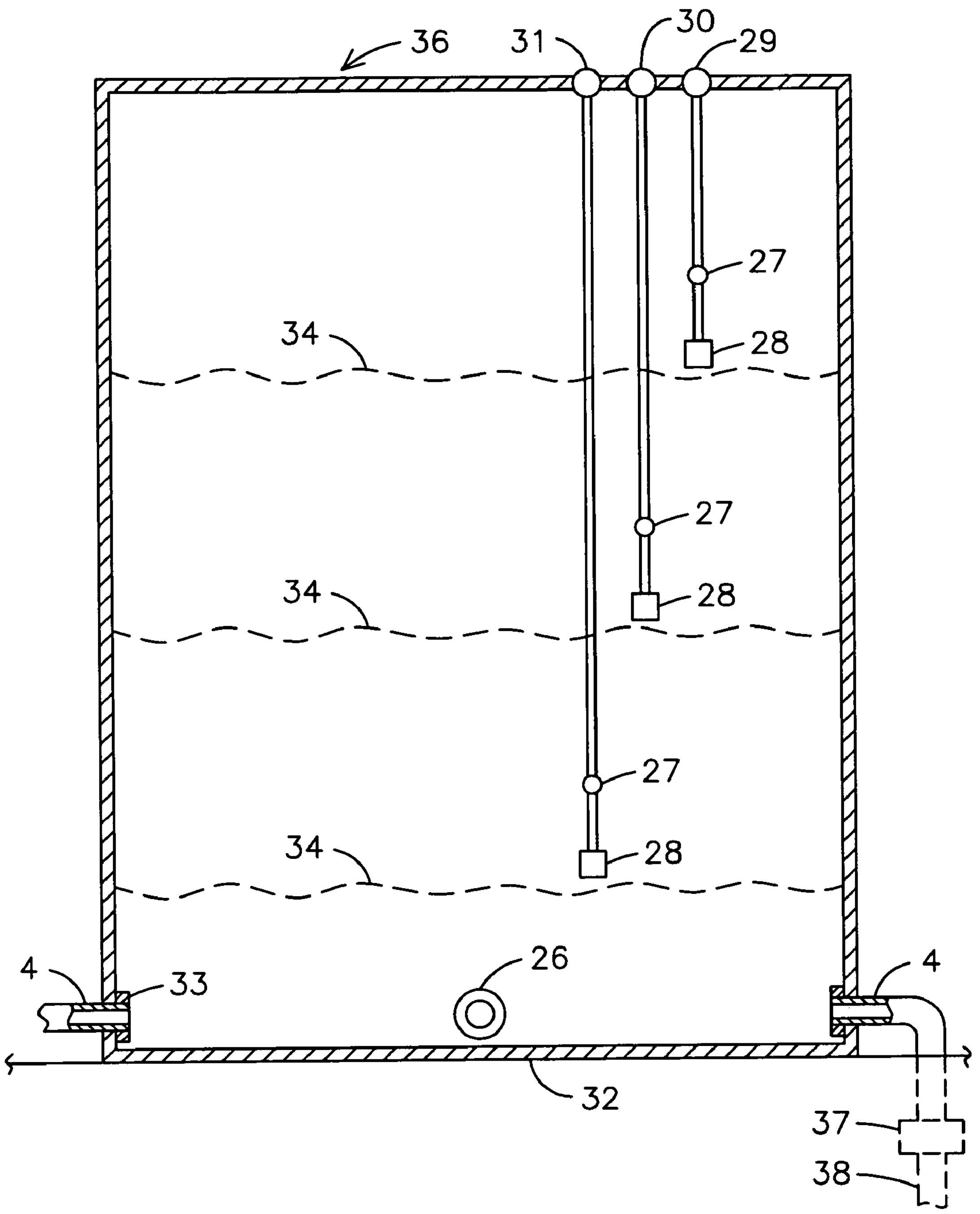
FIG. 5 is a cross-sectional view along line 5-5 of FIG. 1 showing a main water tank of the present invention.

Finally, FIG. 5 shows a cross-sectional view along line 5-5 of FIG. 1 showing a main water tank of the present invention. The main water tank 36 includes at least one float switch 28 and weight 27 that is used to determine varying water levels 34 located within the water tank 2. Preferably, the main water tank 36 includes three float switches 28 and three weights 27 that are located at varying predetermined distances from a tank base 32. A first float switch anchor 29, second float switch anchor 30 and third float switch anchor 31 are located at the top of the tank and hold the float switches 28 and weights 27 within the main water tank 36. A pressure pump tank fitting 26 is located near the tank base 32 and permits the main water tank 36 to be secured to the pressure pump 9. At least one hose tank fitting 33 is also preferably located at the tank base 32 so as to permit the main water tank 36 to be connected to one other water tanks 2 via hoses 4 and optional ball valves 10.

To use the present invention, the water supply system 1 is first installed in a predetermined location, preferably at a ready-mix plant and the water tanks 2 and 36 are filled with a predetermined amount of water so as to substantially fill the water tanks 2 and 36. Then, water is pumped from a well 38 into the main water tank 36 via a submersible pump 37 for holding. Because the water tanks 36 and 2 are all connected to one another, as the water level in the main water tank 36 rises, so does the water level in the remaining water tanks 2. When the water level reaches slightly below the level of a first float switch 28, the water tanks 2 and 36 require an additional water supply to fill the water tanks 2 and 36 to its predetermined full level. When the water level reaches slightly below the level of a second float switch 28, an amber warning light 19, which is located on the electrical housing station 6 and is in electric communication with the second float switch 28, indicates that the water level in the water tanks 2 and 36 is too low. Finally, when the water level reaches slightly below the level of a third float switch 28, a red warning light 20, which is located on the electrical housing station 6 and is in electric communication with the third float switch 28, indicates that the water level in the water tanks 2 and 36 is extremely low and that the submersible pump 37 needs to be activated to refill the water tanks 2 and 36. When the water level in the water tanks 2 and 36 is extremely low, the pressure pump 9 need not be activated as the pressure pump 9 would burn up if there is little to no water in the tanks 2 and 36. When the pressure pump 9 is activated, water is pumped from the water tanks 2 and 36 to the pressure tank 3. The pressure pump 9 may be set to turn off when the water level reaches a predetermined level, such as slightly below the third float switch 28. Thus, the use of the present system allows for a continuous water supply with a steady pressure without overuse and overheating of the pressure pump 9 or submersible pump 37.

In addition, although the present invention is shown as having only one main water tank 36 having float switches 28, weights 27 and anchors 29, 30 and 31, the float switches 28, weights 27 and anchors 29, 30 and 31 may be utilized in all of the water tanks 2 as well.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. A water supply system comprising:

at least one water tank;

at least one pressure pump connected to said at least one water tank;

at least one pressure tank connected to said at least one pressure pump;

at least one float switch located within said at least one water tank; and a means for indicating varying water levels in said at least one water tank.

2. The water supply system of claim 1 wherein:

said means for indicating varying water levels is via at least one warning light in electric communication with the at least one float switch.

3. The water supply system of claim 1 further comprising:

an electrical housing station adjacent to said at least one water tank; and said electrical housing station provides power to said water supply system.

4. The water supply system of claim 2 further comprising:

a control box located in said electrical housing station;

a well pump disconnect located in said electrical housing station; and a pressure pump disconnect located in said electrical housing station.

5. The water supply system of claim 1 further comprising:

at least one weight connected to said at least one float switch.

6. The water supply system of claim 1 further comprising:

at least one water supply pipe connected to said at least one pressure tank.

7. The water supply system of claim 1 further comprising:

at least one water supply connected to said at least one water tank.

8. A water supply system comprising:

at least two water tanks;

at least one water supply connected to said one of said at least two water tanks;

said at least two water tanks are connected to one another;

at least one pressure pump connected one of said at least two water tanks;

at least one pressure tank connected to said at least one pressure pump;

at least one float switch located within said at least two water tanks; and a means for indicating varying water levels in said at least two water tanks.

9. The water supply system of claim 8 wherein:

said means for indicating varying water levels is via at least one warning light in electric communication with the at least one float switch.

10. The water supply system of claim 8 further comprising:

an electrical housing station adjacent to said at least two water tanks; and said electrical housing station provides power to said water supply system.

11. The water supply system of claim 8 wherein:

said at least two water tanks are connected to one another via at least one hose.

12. The water supply system of claim 11 further comprising:

at least one ball valve located on said at least one hose.

13. The water supply system of claim 8 wherein:

said at least one pressure pump is connected to said at least two water tanks via at least one hose.

14. The water supply system of claim 8 wherein:

said at least one pressure tank connected to said at least one pressure pump via at least one hose.

15. The water supply system of claim 14 further comprising:

at least one check valve located on said at least one hose.

16. The water supply system of claim 14 further comprising:

at least one butterfly valve located on said at least one hose.

17. The water supply system of claim 10 further comprising:

a control box located in said electrical housing station;

a well pump disconnect located in said electrical housing station; and a pressure pump disconnect located in said electrical housing station.

18. The water supply system of claim 8 further comprising:

at least one weight connected to said at least one float switch.

19. The water supply system of claim 8 further comprising:

at least one water supply pipe connected to said at least one pressure tank.

20. A water supply system comprising:

at least two water tanks;

at least one water supply connected to one of said at least two water tanks;

said at least two water tanks are connected to one another;

said at least two water tanks are connected to one another via at least one hose;

at least one ball valve is located on said at least one hose that connects said at least two water tanks to one another;

at least one pressure pump connected to one of said at least two water tanks wherein said connection is via a hose;

at least one pressure tank connected to said at least one pressure pump wherein said connection is via a hose;

at least one check valve located on said hose that connects said at least one pressure tank to said at least one pressure pump;

at least one butterfly valve located on said hose that connects said at least one pressure tank to said at least one pressure pump;

at least one float switch located within said at least two water tanks;

a means for indicating varying water levels in said at least two water tanks;

said means for indicating varying water levels is via at least one warning light in electric communication with the at least one float switch;

an electrical housing station adjacent to said at least two water tanks;

said electrical housing station provides power to said water supply system;

a control box located in said electrical housing station;

a well pump disconnect located in said electrical housing station;

a pressure pump disconnect located in said electrical housing station;

at least one weight connected to said at least one float switch; and at least one water supply pipe connected to said at least one pressure tank.

* * * * *